US006544633B1

(12) United States Patent
Ogura

(10) Patent No.: US 6,544,633 B1
(45) Date of Patent: Apr. 8, 2003

(54) IMAGE-FORMING METHOD, AND IMAGE-FORMING TRANSPARENT FILM

(75) Inventor: Motohiro Ogura, Odawara (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/515,855

(22) Filed: Feb. 29, 2000

(30) Foreign Application Priority Data

Mar. 2, 1999 (JP) .......................................... 11-054345

(51) Int. Cl.[7] .................................................. B32B 7/00

(52) U.S. Cl. ....................... 428/212; 428/195; 428/213; 428/323; 428/913; 428/914; 428/219; 399/390; 399/397

(58) Field of Search ................................ 428/195, 213, 428/323, 913, 914, 212, 219; 399/390, 397

(56) References Cited

U.S. PATENT DOCUMENTS 5,572,291 A * 11/1996 Moriguchi et al. ......... 399/390

FOREIGN PATENT DOCUMENTS

| | | |
|---|---|---|
| EP | 0 403 311 | 12/1990 |
| EP | 0 633 508 | 1/1995 |
| EP | 0 892 311 | 1/1999 |
| JP | 57-76554 | 5/1982 |
| JP | 58-90647 | 5/1983 |
| JP | 3-170944 | 7/1991 |
| JP | 6-40605 | 2/1994 |
| JP | 7-49581 | 2/1995 |
| JP | 9-137082 | 5/1997 |

* cited by examiner

*Primary Examiner*—Deborah Jones
*Assistant Examiner*—Ling Xu
(74) *Attorney, Agent, or Firm*—Fitzpatrick, Cella, Harper & Scinto

(57) ABSTRACT

An image-forming method and an image-forming transparent film are provided which can form a high-grade transparent recorded image such that any unwanted opaque matter other than images formed is not present on the transparent film on which the images have been formed. The transparent film is provided on its surface with an opaque sensing mark layer capable of turning transparent upon heating with a fixing roller and an opaque mark layer capable of turning transparent upon that heating. The opaque mark layer is capable of more readily turning transparent upon heating than the opaque sensing mark layer and is formed on the side upstream in the film transport direction from the position coming after substantially one rotation of the fixing roller, measured from an end of the transparent film in its transport direction, and the opaque sensing mark layer is formed on the downstream side of the opaque mark layer.

7 Claims, 3 Drawing Sheets

IMAGE-FORMING METHOD, AND IMAGE-FORMING TRANSPARENT FILM

BACKGROUND OF THE INVENTION

1. Field of the Invention

This invention relates to an image-forming method for forming an image on a transparent film used as a transparent recording medium through which the image is projected on a screen by an overhead projector (OHP), and an image-forming transparent film used in such a method; the film being usable in electrophotographic apparatus, electrostatic recording apparatus and so forth. More particularly, it relates to an image-forming method of forming an image on a transparent film having an opaque zone that serves as a marking for optically detecting the position of the transparent film in an image-forming apparatus or serves as a marking for optically detecting the state of transport of the transparent film in the image-forming apparatus, and an image-forming transparent film used in such a method.

2. Related Background Art

Forming images on OHP films in recording apparatuses such as electrophotographic, ink-jet or thermal transfer recording apparatuses is conventionally in wide use. Its importance is considered to increase in the future.

As OHP films, resin films such as polyethylene terephthalate film with a thickness of about 100 to 150 μm are commonly often used, and a desired image-recording layer (image-receiving layer) is optionally provided thereon so that the fixability, maintenance or resolution of images can also be improved.

It is also common to provide a transparent film with an opaque mark beforehand on its surface for the purpose of its use in common with opaque recording sheets in one image-forming apparatus, and to sense this opaque mark by an optical sensor of the image-forming apparatus to detect the position of the transparent film. However, such an opaque mark for detecting the position of the transparent film remains also after image formation to bring about the problems that it remains as an image extraneous to the recorded image to make OHP-projected images very unsightly and also make images illegible when it overlaps with the recorded image.

As a countermeasure therefor, it is proposed in, e.g., Japanese Patent Applications Laid-open No. 57-76554 and No. 58-90647 to provide a transparent film with a readily peelable opaque member at an edge on its side opposite to the side on which images are transferred (i.e., image transfer side). The transparent film proposed therein enables optical detection with the readily peelable opaque member provided at an edge on the side opposite to the image transfer side. When used in OHP, the opaque member is peeled, thus the whole film can effectively be used, as so stated.

In such a method, however, there is a possibility that the opaque member peels off midway in the course the transparent film is transported through inside the image-forming apparatus. This may cause trouble of the image-forming apparatus. Also, users must pay attention also when the opaque member is peeled, and there arise problems that the film may break and scratches and adhesive paste used may remain on the film.

In Japanese Patent Application Laid-open No. 3-170944, also proposed is a transparent film, an opaque member provided on the surface of which turns transparent upon heating to become invisible. The transparent film proposed therein has advantages that the above peel-off in the image-forming apparatus and users' attention may no longer be of any concern. It, however, has been found that this opaque member causes a problem that, when formed simply, it does not become sufficiently invisible after only one rotation of a fixing roller. This is because the heat of the fixing roller is partly lost through the transfer material and the fixing roller from which the heat has partly been lost supplies that heat to the transparent film.

SUMMARY OF THE INVENTION

An object of the present invention is to solve the above problems to provide an image-forming method that can form a high-grade recorded image such that any unwanted opaque matter other than images formed is present on the transparent film on which the images have been formed, and an image-forming transparent film used in such a method.

Another object of the present invention is to provide an image-forming method that can form a high-grade transparent recorded image such that, even though an opaque zone is provided in a transparent film at its position coming after one rotation of a fixing roller, any unwanted opaque matter other than images formed is not present on the transparent film after fixing, and an image-forming transparent film used in such a method.

The present invention provides an image-forming method comprising forming an image on a transparent film for an overhead projector, followed by fixing in a fixing step to form a recorded image, wherein

- the transparent film is provided on its surface with an opaque sensing mark layer capable of turning transparent upon heating with a fixing roller and an opaque mark layer capable of turning transparent upon that heating;
- the opaque mark layer being capable of more readily turning transparent upon heating than the opaque sensing mark layer and being formed on the side upstream in the film transport direction from the position coming after substantially one rotation of the fixing roller, measured from an end of the transparent film in its transport direction; and
- the opaque sensing mark layer being formed on the downstream side of the opaque mark layer.

The present invention also provides an image-forming transparent film having on its surface an opaque sensing mark layer capable of turning transparent upon heating and an opaque mark layer capable of turning transparent upon that heating,

- the opaque mark layer being formed on the side upstream to the opaque sensing mark layer in the film transport direction and being so formed as to be capable of more readily turning transparent upon heating than said opaque sensing mark layer.

In the image-forming method of the present invention, in order to solve the problem that the opaque zone provided on the surface of the transparent film does not become sufficiently transparent at its part coming after one rotation of the fixing roller, an opaque sensing mark layer is formed in a film area extending between the part with which the fixing roller begins to come into contact and the part where it has substantially rotated once, and an opaque mark layer is formed on the upstream side of the opaque sensing mark layer. The opaque mark layer is a layer capable of turning transparent upon heating at a temperature lower than the temperature at which the opaque sensing mark layer turns transparent.

The opaque mark layer may have an optical function as a sensing mark. It may also be utilized as an indication mark that shows the transport direction of the transparent film, and an indication mark for distinguishing between the surface and the back of the transparent film.

Thus, in the transparent film according to the present invention, the opaque sensing mark layer is formed on the downstream or forward side in the transport direction, and the opaque mark layer on the upstream or backward side.

DESCRIPTION OF THE PREFERRED EMBODIMENTS

The present invention will be described below in detail.

Figure 1:
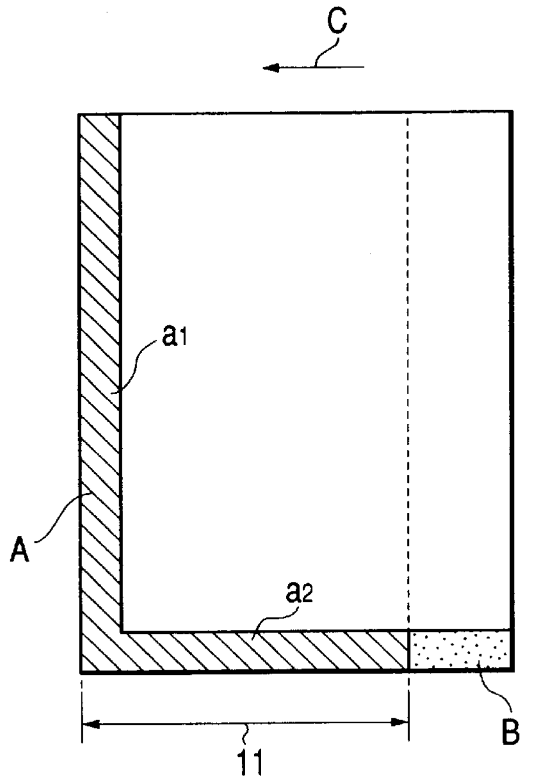
FIG. 1 is a schematic view of the transparent film according to the present invention.

FIG. 1 is a plan view of the transparent film according to the present invention. In the drawing, an arrow C denotes the film transport direction; a shaded zone A, an opaque sensing mark layer; and a dotted zone B, an opaque mark layer. Usually, the sensing mark is provided non-symmetrically on at least either of right and left side edges in the film transport direction and extends in the shape of a belt along at least one side edge of the transparent film and outside its image-forming region. The zone B (opaque mark layer) may be made smaller in thickness than the zone A with respect to the diameter of a fixing roller so that the zone B is capable of turning transparent at a lower temperature than the zone A. Length 11 from the leading end of the transparent film in its transport direction depends on the diameter of the fixing roller. For example, when the fixing roller is 60 mm in diameter, the length 11 from the leading end is 60π mm and the marking must come to be the opaque mark layer at the position beyond at least about 60π mm.

More specifically, after the fixing roller has rotated once on the transparent film surface, its heat has partly been lost therefrom over its whole periphery, through the transparent film, and the opaque mark layer must be turned transparent in the state the heat has been partly lost. Hence, the opaque mark layer must be kept capable of turning transparent even with such a fixing roller having an insufficient heat.

The opaque mark layer may be formed by providing the opaque sensing mark layer in a small thickness. Alternatively, it may be formed by a method in which it is formed using a material capable of readily melting at a lower temperature than a material that forms the opaque sensing mark layer, or a method in which it is formed using a material capable of undergoing decolorization reaction at a lower temperature than a coloring material that forms the opaque sensing mark layer.

The opaque mark layer may preferably be a layer capable of turning transparent at a temperature lower by at least 10° C. than a corresponding temperature for the opaque sensing mark layer. In the case that the opaque mark layer is formed by providing the opaque sensing mark layer in a smaller thickness for such purpose, the opaque mark layer may preferably have such a transmittance that the value obtained by subtracting the transmittance of the opaque sensing mark layer from the transmittance of the opaque mark layer is 1% or more to the light for detecting the position of the transparent film. In a case where the opaque sensing mark layer and opaque mark layer are formed by coating, the opaque mark layer may preferably be in a coating weight per unit area of not more than 75% of that of the opaque sensing mark layer.

The opaque sensing mark layer may have the shape as shown in FIG. 1 as a typical example. It may have a different shape. For example, the opaque sensing mark layer shown in FIG. 1, which consists of a zone a1 formed along an end of the transparent film in its transport direction and a zone a2 formed along one side edge of the transparent film, may consist of either only the zone a1 or only the zone a2. Also, in addition to the zones a1 and a2, another opaque sensing mark layer may be formed along the upper side edge as viewed in the drawing. Still also, the opaque sensing mark layer may be so formed as to leave a certain distance from the leading end of the transparent film in the transport direction.

The opaque sensing mark layer is formed as a continuous or discontinuous marking at a zone extending between the position where the fixing roller begins to come into contact with the transparent film, i.e., the leading edge of the transparent film, and the position where it has substantially rotated once. The position where the fixing roller has substantially rotated once may preferably be within plus-minus 5 mm, and particularly plus-minus 1 mm, of the position where the fixing roller has exactly rotated once. The opaque mark layer is formed as a continuous or discontinuous marking, on the upstream side of the position where the fixing roller has substantially rotated once.

In a case where it is desired for the opaque mark layer not to function as a sensing mark, the opaque mark layer may preferably be made to have a transmittance set in a region beyond its detectable level, e.g., a transmittance of 15% or more. In view of the degree of recognition of the opaque mark layer, it may preferably have a transmittance of 90% or less.

Figure 2:
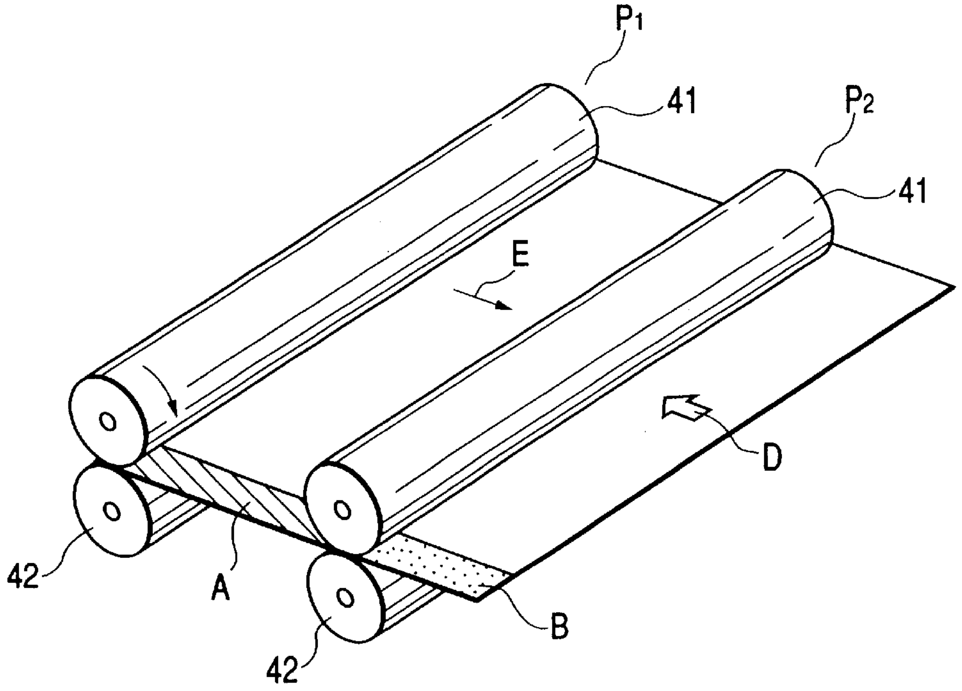
FIG. 2 illustrates how the transparent film of the present invention and a fixing roller are relatively positioned after one rotation of the latter.

FIG. 2 schematically illustrates how the transparent film moves forward while the fixing roller rotates once. The transparent film moves forward in the direction of D shown in the drawing, and the fixing roller shifts relative-positionally in the direction of an arrow E with respect to the transparent film. More specifically, a pair of rollers, a fixing roller 41 and a pressure roller 42, hold the leading end of the transparent film between them, and they relative-positionally shift from a position P1 to a position P2 when the fixing roller 41 rotates once. FIG. 2 illustrates a positional change of the transparent film when the fixing roller has rotated once. In an actual image-forming apparatus, the fixing roller and the pressure roller are set stationary but rotatably. Only the transparent film is moved and transported.

The opaque sensing mark layer and opaque mark layer may be formed on the transparent film on its side opposite to the side on which images are formed. This is preferable in view of an advantage that they do not affect the formation of images. In order to obtain sharper projected images, it is more preferable for the opaque sensing mark layer and opaque mark layer to be formed at a position outside the image-forming region of the transparent film, or at a position on the opposite side of the transparent film, corresponding to the position outside the image-forming region of the transparent film. Since, however, both the opaque sensing mark layer and the opaque mark layer are turned transparent upon heating, they may also be formed even in the image-forming region.

Figure 5:
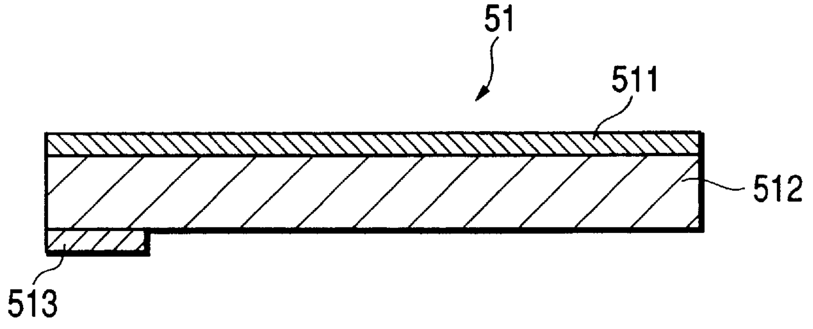
FIG. 5 is a schematic cross-sectional view of the transparent film according to the present invention.

FIG. 5 is a schematic cross-sectional view showing a layer configuration commonly usable in the transparent film of the present invention. As shown in FIG. 5, a transparent film 51 of the present invention is a transparent film comprising a transparent base material 512 having thereon an image-receiving layer 511. The opaque sensing mark layer and opaque mark layer, 513, are provided at any position of the transparent film. In the present embodiment, they are provided on the transparent base material 512 along its one side edge.

Figure 6:
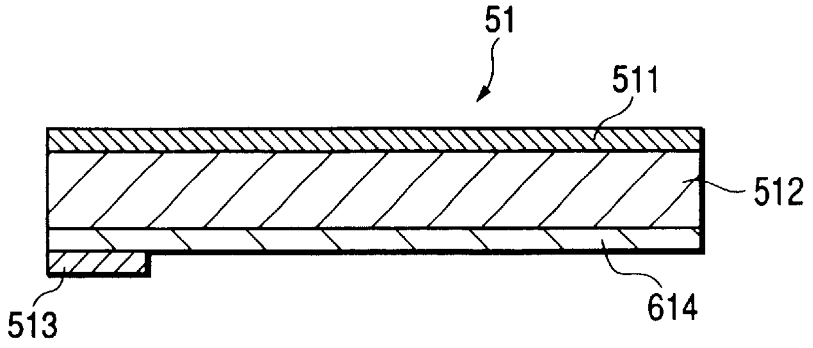
FIG. 6 is a schematic cross-sectional view of another transparent film according to the present invention, having an anchor coat layer.

As shown in FIG. 6, an anchor coat layer 614 may be formed between the transparent base material 512 and the opaque sensing mark layer and opaque mark layer 513.

As the transparent base material, any of those conventionally known may be used. Stated specifically, it may include cellophane, and plastic films or sheets formed of polyester resin, diacetate resin, triacetate resin, polystyrene resin, polyethylene resin, polycarbonate resin, polymethacrylate resin, Celluloid, polyvinyl chloride resin or polyimide resin.

This transparent base material may commonly preferably have a thickness of, but not particularly limited to, from about 1 to 5,000 μm, and more preferably from 70 to 150 μm. With regard to the transparent base material as a base, it may preferably have a haze (JIS K-6714) of 4% or less. If it has a haze more than 4%, the whole may look so dark as to make recorded images colorless as a transparent film for color electrophotography.

The image-receiving layer 511 is formed on such a transparent base material directly or via an adhesive layer. With regard to the image-receiving layer 511, it may be formed using any known image-receiving layer material of various types, e.g., those for electrophotography. Stated specifically, such a material may include polyolefin resins such as polyethylene and polypropylene, resins such as polyvinyl chloride, polyvinylidene chloride, polyvinyl acetate, polyacrylic ester, polyethylene terephthalate and polybutylene terephthalate, polystyrene resins, polyamide resins, copolymer resins of an olefin such as ethylene or propylene with other vinyl monomer, ionomers, cellulose resins such as cellulose diacetate, and polycarbonate resins. To the image-receiving layer, additives may further be added in accordance with the above resins, and these may be dissolved or dispersed in a suitable solvent to prepare a composition. The composition thus prepared may be coated on the transparent base material by a known process, followed by appropriate drying to form the layer. Here, the image-receiving layer may preferably be formed in a thickness of from 1 to 20 μm.

The opaque sensing mark layer and opaque mark layer 513 may, before they are fixing-processed, be constituted of a resin layer with a porous structure having cracks or communicating pores internally, and are capable of turning transparent upon heating or heating and pressing. For bringing out such properties, the opaque sensing mark layer and opaque mark layer 513 are formed by coating on the transparent base material a composition comprised chiefly of resin particles (thermoplastic resin powder) and a binder and prepared by optionally adding additives thereto and dissolving or dispersing these in a suitable solvent, followed by coating and drying by a known means.

Figure 3:
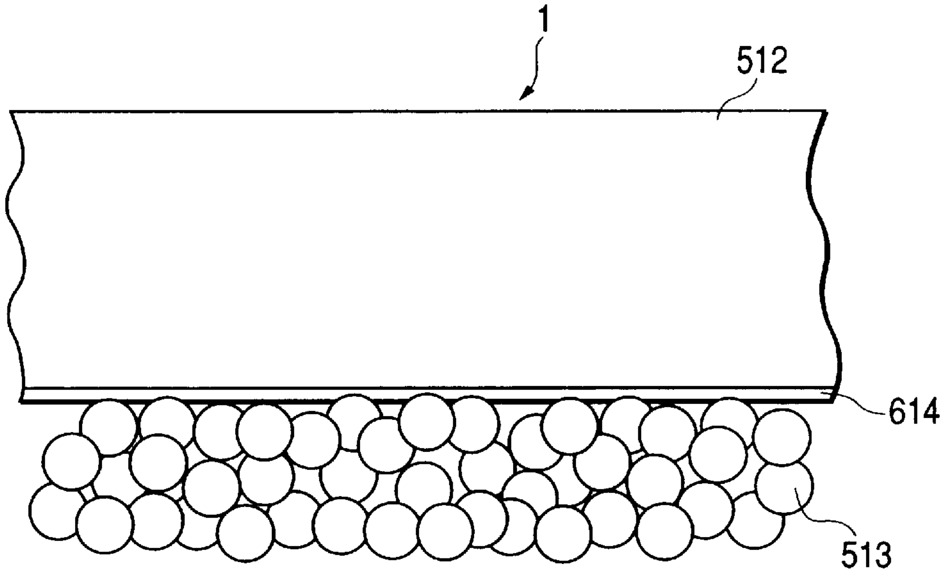
FIG. 3 is an enlarged cross-sectional view of the transparent film of the present invention at its part forming a sensing mark.

Such opaque sensing mark layer and opaque mark layer 513 may be formed by, as shown in FIG. 3, coating on the transparent base material 512 of the transparent film 1 the above composition comprising thermoplastic resin powder (resin particles) emulsion, followed by heating or heating-and-pressing to make the resultant coating uniform.

The resin powder may include, e.g., powders of polyethylenes, polymethacrylates, elastomers, ethylene-vinyl acetate copolymer, styrene-acrylate copolymer, polyesters, polyacrylates or polyvinyl ethers. Any of these may be used alone or in the form of a mixture of two or more types. The resin powder is by no means limited to the above resin powders, and any other known materials may be used as long as they are not adherent to recording materials and transparent films, do not act as a binder to the toner for forming images on transparent films and are capable of turning transparent. The binder used has the function to bind the resin particles to one another and/or bind them to sheet members, and, like the resin particles, may preferably not act as a binder to the toner.

As materials preferable for the binder, any conventionally known materials may be used as long as they have the function stated above, including, e.g., polyvinyl alcohol, acrylic resins, styrene-acrylate copolymer, polyvinyl acetate, ethylene-vinyl acetate copolymer, starch, polyvinyl butyral, gelatin, casein, ionomers, gum arabic, carboxymethyl cellulose, polyvinyl pyrrolidone, polyacrylamide, polyurethanes, melamine resins, epoxy resins, styrene-butadiene rubbers, urea resins, phenolic resins, α-olefin resins, chloroprene rubbers and nitrile rubbers. At least one of these may be used.

In order to improve the function as sensing marks, various additives may further be added, as exemplified by a surface-active agent, a fluorescent brightener, an antiseptic, an anti-mildew agent, a penetrant and a cross-linking agent.

As to the mixing proportion (weight ratio) of the resin particles to the binder, the mixing of the binder in a too large proportion may make the porous structure have less cracks or communicating pores, so that the resin layer may have a high transmittance before fixing. The mixing of the resin particles in a too large proportion may make insufficient the adhesion between the resin particles themselves and between the sheet member (transparent base material) and the resin particles.

The thickness of the opaque sensing mark layer depends also on the transmittance required and apparatus conditions such as the quantity of a release agent, and may preferably be from 1 to 200 μm, and more preferably from 3 to 50 μm.

On a sheet member 512 (the transparent base material), the opaque sensing mark layer and opaque mark layer 513 are formed. As a method therefor, a coating fluid is prepared by dissolving or dispersing the above materials in a suitable solvent, and this coating fluid is coated on the sheet member 512. Here, as shown in FIG. 6, an anchor coat layer 614 formed of a resin may preferably beforehand be formed on the sheet member 512 so that the adhesion between the sheet member 512 and the opaque sensing mark layer and opaque mark layer 513 can be made appropriate. Then the coating fluid may be coated in a layer by a known process, e.g., roller coating, rod bar coating or spray coating, immediately followed by drying.

The anchor coat layer 614 is a layer that acts to improve the adhesion between the sheet member 512 and the opaque sensing mark layer and opaque mark layer 513 in such a case where the materials for the sheet member 512 and those for the opaque sensing mark layer and opaque mark layer 513 have greatly different solubility parameters, and on the other hand acts to reduce the adhesion between the sheet member 512 and the opaque sensing mark layer and opaque mark layer 513 in such a case where the materials for the sheet member 512 and those for the opaque sensing mark layer and opaque mark layer 513 have equal or too close solubility parameters.

The resin used to form the anchor coat layer 614 may specifically include polyvinyl alcohol, acrylic resins, styrene-acrylate copolymer, polyvinyl acetate, ethylene-vinyl acetate copolymer, starch, polyvinyl butyral, gelatin, casein, ionomers, gum arabic, carboxymethyl cellulose, polyvinyl pyrrolidone, polyacrylamide, polyurethanes, melamine resins, epoxy resins, styrene-butadiene rubbers, urea resins, phenolic resins, α-olefin resins, chloroprene rubbers and nitrile rubbers. At least one of these may be so used as to fulfill the above conditions.

A fixing assembly used in the image-forming apparatus to make the mark layers turn transparent in the present invention will be described below.

Figure 4:
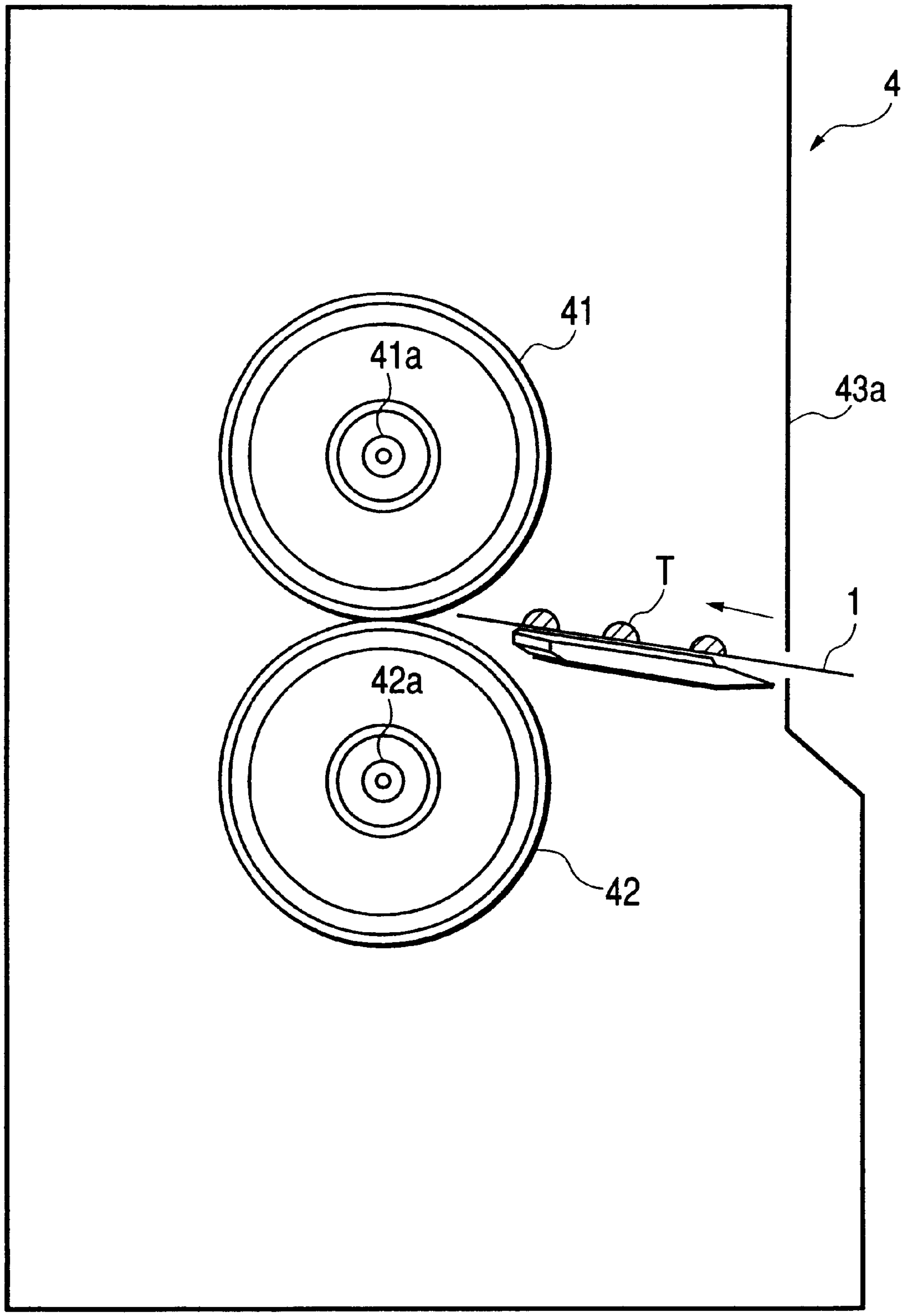
FIG. 4 is a cross-sectional view of a heat-roller type fixing assembly used in the present invention.

FIG. 4 shows an example of a heat-roller type fixing assembly. Reference numeral 41 denotes a fixing roller, and 42 a pressure roller, having halogen heaters 41*a* and 42*a*, respectively, which are heat sources provided internally. These rollers are rotated in pressure contact with each other.

A transfer material 1 holding a toner image T on the side of the fixing roller is transported toward the fixing roller, 4, and subsequently the transfer material 1 is transported while being held between the fixing and pressure rollers 41 and 42, during which the toner image T on the transfer material 1 is heated and pressed and is melt-fixed onto the transfer material 1.

EXAMPLES

The present invention will be described below in greater detail by giving Examples.

Example 1

A transparent film comprising polyethylene terephthalate (PET) film of 100 μm thick as the transparent base material and a polyester resin film (VYLON, trade name; available from Toyobo Co., Ltd.; Tg=56° C.) of 3 μm thick formed thereon as an electrophotographic image-receiving layer was prepared. This film had a haze of 3.0% (measured with a measuring instrument manufactured by Nippon Denshoku K.K.). Then, at a predetermined position on the back side of the base material outside the image-forming region, a coating fluid prepared by mixing 100 parts by weight of a styrene-acrylate copolymer resin (VONCOAT PP-1000, trade name; available from Dainippon Ink & Chemicals, Incorporated; solid content: 45%), 30 parts by weight of polyvinyl alcohol (PVA-117, trade name; available from Kuraray Co., Ltd.; aqueous 10% solution) and 0.3 part by weight of a surface-active agent (PELETEX TO-P, trade name; available from Kao Corporation; solid content: 70%) was coated by means of a bar coater. Here, taking account of the fixing roller having a diameter of 60 mm, the bar coater was replaced with the one having a half groove so that the coating fluid was in a coating weight of 50% by weight per unit area at the part extending beyond 60π mm from the leading end, followed by drying at 80° C. for 10 minutes in a drying oven. Thus, a transparent film was produced having an opaque sensing mark layer (thickness: 2 μm) and an opaque mark layer (thickness: 1.5 μm) which were of 8 mm in line width, formed as shown in FIG. 1. The opaque mark layer was 20 mm in length.

On this transparent film, an unfixed color toner transparent image was formed using a color electrophotographic copying machine (CLC1150, trade name; manufactured by CANON INC.). This image was fixed by means of the heat-roller type fixing assembly shown in FIG. 4 (fixing temperature: 155° C.; pressure: 3 kg/cm$^2$; fixing speed: 75 mm/s). As a result, the resin particles forming the opaque sensing mark layer and opaque mark layer were bound together and turned transparent, and the part having turned transparent had a haze of 8.0%. The image was projected through an OHP, where, although the part having turned transparent was recognizable, there was no problem on the image projection.

Example 2

A transparent film was produced in the same manner as in Example 1 except that the same coating fluid as that in Example 1 was coated by means of a bar coater up to the position coming after one rotation of the fixing roller and, from the position coming after one rotation of the fixing roller, the coating fluid which was diluted by using the polyvinyl alcohol as a solvent in a doubled amount of 60 parts by weight so that the coating fluid was in a coating weight of 50% by weight was coated by means of the same bar coater. The opaque sensing mark layer had a transmittance of 10% to light of 980 nm, and the opaque mark layer, positioned after one round of the fixing roller and having a smaller thickness, had a transmittance of 60%.

Using this transparent film, a color toner transparent image was formed and then the image was fixed by means of the heat-roller type fixing assembly, in the same manner as in Example 1. As a result, the resin particles were bound together and turned transparent, and both the opaque sensing mark layer and the opaque mark layer came to have a haze of 7.5%. The image was projected through an OHP, where, although the part having turned transparent was recognizable, there was no problem on the image projection.

Example 3

A transparent film was produced in the same manner as in Example 1 except that the coating fluid as used in Example 1 was coated using a gravure coater, and its coater plate for the position coming after one rotation of the fixing roller was made to have a shallow depression so as to reduce the coating weight to a half of that at the previously coated area. The opaque sensing mark layer had a transmittance of 8%, and the opaque mark layer, positioned after one round of the fixing roller, had a transmittance of 45%.

Using this transparent film, a color toner transparent image was formed and then the image was fixed by means of the heat-roller type fixing assembly, in the same manner as in Example 1. As a result, the resin particles were bound together and turned transparent, and both the opaque sensing mark layer and the opaque mark layer came to have a haze of 9%. The image was projected through an OHP, where, although the part having turned transparent was recognizable, there was no problem on the image projection.

Comparative Example 1

In Example 1, the bar coater was not replaced when the opaque sensing mark layer and opaque mark layer were formed by coating, thus the coating weight at the position coming after one rotation of the fixing roller was made equal. The opaque sensing mark layer formed had a transmittance of 10%.

Using the transparent film thus produced, a color toner transparent image was formed and then the image was fixed by means of the heat-roller type fixing assembly, in the same manner as in Example 1. The opaque sensing mark layer came to have a haze of 8% at the position coming before one rotation of the fixing roller. However, the opaque sensing mark layer at the position coming after one rotation of the fixing roller came to have a haze of 25%, which obstructed the image projection.

Comparative Example 2

In Example 2, the coating fluid used at the transparent-film position coming after one rotation of the fixing roller was not diluted when the opaque sensing mark layer and opaque mark layer were formed by coating, thus the whole layer was formed alike. The opaque sensing mark layer formed had a transmittance of 9%.

Using the transparent film thus produced, a color toner transparent image was formed and then the image was fixed by means of the heat-roller type fixing assembly, in the same manner as in Example 1. The opaque sensing mark layer came to have a haze of 9% at the position coming before one rotation of the fixing roller, but, at the position coming after one rotation of the fixing roller, came to have a haze of 30%, which obstructed the image projection.

Comparative Example 3

In Example 3, the plate of the gravure coater was not adjusted for the position coming after one rotation of the fixing roller when the opaque sensing mark layer and opaque mark layer were formed by coating, thus the whole layer was formed alike. The opaque sensing mark layer formed had a transmittance of 10%.

Using the transparent film thus produced, a color toner transparent image was formed and then the image was fixed by means of the heat-roller type fixing assembly, in the same manner as in Example 1. The opaque sensing mark layer came to have a haze of 9% at the position coming before one rotation of the fixing roller, but, at the position coming after one rotation of the fixing roller, came to have a haze of 28%, which obstructed the image projection.

Example 4

In Example 1, the opaque mark layer was formed using a coating fluid in which the styrene-acrylate copolymer resin of the coating fluid used to form the opaque sensing mark layer and opaque mark layer was replaced with a styrene-acrylate copolymer having a softening point of 90° C., lower by 10° C. Both the opaque sensing mark layer and the opaque mark layer were formed in a thickness of 2 μm. The opaque sensing mark layer thus formed had a transmittance of 10%, and the opaque mark layer a transmittance of 13%.

Using this transparent film, a color toner transparent image was formed and then the image was fixed by means of the heat-roller type fixing assembly, in the same manner as in Example 1. As a result, both the opaque sensing mark layer and the opaque mark layer came to have a haze of 8.0%. The image was projected through an OHP, where, although the opaque sensing mark layer and opaque mark layer were recognizable as being present, there was no problem at all on the image projection.

Example 5

In Example 1, the opaque mark layer was formed under the same conditions as the opaque sensing mark layer except that drying conditions were changed to 60° C. for 20 minutes. As a result, the porous surface of the opaque sensing mark layer had pores with gaps of about 2 μm, whereas the porous surface of the opaque mark layer had pores with gaps of about 1 μm. The opaque sensing mark layer of the transparent film thus formed had a transmittance of 10%, and the opaque mark layer a transmittance of 30%.

Using this transparent film, a color toner transparent image was formed and then the image was fixed by means of the heat-roller type fixing assembly, in the same manner as in Example 1. As a result, both the opaque sensing mark layer and the opaque mark layer came to have a haze of 8.0%. The image was projected through an OHP, where, although the opaque sensing mark layer and opaque mark layer were recognizable as being present, there was no problem at all on the image projection.

What is claimed is:

1. An image-forming transparent film having on its surface an opaque sensing mark layer capable of turning transparent upon heating and which serves as a marking for optically detecting the position of the film and an opaque mark layer capable of turning transparent upon that heating, said opaque mark layer being formed at a position further from a leading edge of the film than the opaque sensing mark layer and being so formed as to turn transparent upon heating more readily than said opaque sensing mark layer in that said opaque mark layer turns transparent at a temperature lower by at least 10° C. than a temperature that said opaque sensing mark layer turns transparent, said opaque sensing mark laying being formed at either the leading edge or a position nearer to the leading edge than the position at which the opaque mark layer is formed.

2. The image-forming transparent film according to claim 1, wherein said opaque sensing mark layer and said opaque mark layer are formed in the shape of a belt along a side edge of the transparent film different from the leading edge.

3. The image-forming transparent film according to claim 1, wherein said opaque sensing mark layer and said opaque mark layer are formed on the transparent film on a side opposite to the side on which images are formed.

4. An image-forming transparent film having on its surface an opaque sensing mark layer capable of turning transparent upon heating and which serves as a marking for optically detecting the position of the film and an opaque mark layer capable of turning transparent upon that heating, said opaque mark layer i) being formed at a position further from a leading edge of the film than the opaque sensing mark layer, ii) being so formed as to turn transparent upon heating more readily than said opaque sensing mark layer in that said opaque mark layer turns transparent at a temperature lower than a temperature that said opaque sensing mark layer turns transparent, iii) having a smaller thickness than said opaque sensing mark layer, and iv) being formed in the same manner as said opaque sensing mark layer, said opaque sensing mark layer being formed at either the leading edge or at a position nearer to the leading edge than the position at which the opaque mark layer is formed.

5. The image-forming transparent film according to claim 4, wherein the value obtained by subtracting the transmittance of said opaque sensing mark layer from the transmittance of said opaque mark layer is 1% or more.

6. The image-forming transparent film according to claim 4, wherein said opaque sensing mark layer and said opaque mark layer are formed by coating in such a way that said opaque mark layer has a coating weight per unit area of not more than 75% of that said opaque sensing mark layer.

7. The image-forming transparent film according to claim 4, wherein said opaque sensing mark layer and said opaque mark layer are formed on the transparent film on a side opposite to the side on which images are formed.

* * * * *

UNITED STATES PATENT AND TRADEMARK OFFICE

CERTIFICATE OF CORRECTION

PATENT NO. : 6,544,633 B1
DATED : April 8, 2003
INVENTOR(S) : Ogura

It is certified that error appears in the above-identified patent and that said Letters Patent is hereby corrected as shown below:

Column 10,
Line 24, "laying" should read -- layer --.

Signed and Sealed this

Eleventh Day of November, 2003

JAMES E. ROGAN
*Director of the United States Patent and Trademark Office*